United States Patent
Zimmanck et al.

(10) Patent No.: US 11,201,469 B2
(45) Date of Patent: Dec. 14, 2021

(54) METHOD AND APPARATUS FOR AUTOMATIC INTERLEAVING OF CYCLED LOADS IN A MICROGRID

(71) Applicant: Enphase Energy, Inc., Petaluma, CA (US)

(72) Inventors: Donald Richard Zimmanck, Sebastopol, CA (US); Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 16/942,457

(22) Filed: Jul. 29, 2020

(65) Prior Publication Data

US 2021/0057910 A1    Feb. 25, 2021

Related U.S. Application Data

(60) Provisional application No. 62/879,919, filed on Jul. 29, 2019.

(51) Int. Cl.
*H02J 3/14* (2006.01)
*G05B 19/042* (2006.01)
(Continued)

(52) U.S. Cl.
CPC .............. *H02J 3/14* (2013.01); *G05B 19/042* (2013.01); *H02J 3/144* (2020.01); *H02J 3/381* (2013.01);
(Continued)

(58) Field of Classification Search
CPC .... H02J 3/14; H02J 3/381; H02J 3/388; H02J 3/466; H02J 2310/14; G01D 2204/12;
(Continued)

(56) References Cited

U.S. PATENT DOCUMENTS 7,652,394 B2 * 1/2010 Hirst ................ H02J 3/06
307/73
7,830,037 B2 * 11/2010 Hirst ................ H02J 3/14
307/39
(Continued)

FOREIGN PATENT DOCUMENTS

CN    103248256 A    8/2013
CN    102694381 B    7/2014
(Continued)

OTHER PUBLICATIONS

International Search Report for Application No. PCT/US2020/044083, dated Nov. 19, 2020.

*Primary Examiner* — Crystal J Barnes-Bullock
(74) *Attorney, Agent, or Firm* — Moser Taboada

(57) ABSTRACT

A method and apparatus for autonomous, automatic interleaving of cycled loads coupled to a grid. In one or more embodiments, the method comprises (i) determining, by a smart load coupled to a grid, a first grid stress value; (ii) comparing, by the smart load, the first grid stress value to an activation threshold; (iii) waiting, by the smart load, when the first grid stress value is less than the activation threshold, a delay period; (iv) determining, by the smart load and after the delay period ends, a second grid stress value; (v) comparing, by the smart load, the second grid stress value to the activation threshold; and (iv) activating, by the smart load, when the second grid stress value is less than the activation threshold.

20 Claims, 6 Drawing Sheets

(51) Int. Cl.
*H02J 3/38* (2006.01)
*H02J 3/46* (2006.01)
*G06Q 50/06* (2012.01)

(52) U.S. Cl.
CPC .............. *H02J 3/388* (2020.01); *H02J 3/466* (2020.01); *G01D 2204/12* (2021.05); *G01D 2204/30* (2021.05); *G05B 2219/2639* (2013.01); *G06Q 50/06* (2013.01); *H02J 2310/14* (2020.01); *Y02B 90/20* (2013.01); *Y04S 10/50* (2013.01); *Y04S 20/221* (2013.01); *Y04S 20/242* (2013.01); *Y04S 20/30* (2013.01)

(58) Field of Classification Search
CPC .............. G01D 2204/30; G05B 19/042; G05B 2219/2639; G06Q 50/06; Y02B 70/3225; Y02B 90/20; Y04S 10/50; Y04S 20/221; Y04S 20/222; Y04S 20/242; Y04S 20/30
See application file for complete search history.

(56) References Cited

U.S. PATENT DOCUMENTS

| | | | |
|---|---|---|---|
| 8,073,573 B2 * | 12/2011 | Chassin | G06F 7/588 |
| | | | 700/286 |
| 8,340,832 B1 * | 12/2012 | Nacke | G05B 15/02 |
| | | | 700/295 |
| 8,396,607 B2 * | 3/2013 | Hirst | H02J 3/24 |
| | | | 700/295 |
| 9,234,246 B1 * | 1/2016 | Davis | H02J 3/14 |
| 9,261,079 B2 * | 2/2016 | Knuppel | H02J 3/48 |
| 9,472,954 B2 | 10/2016 | Piyabongkarn et al. | |
| 9,600,045 B2 * | 3/2017 | Sanders | G05B 15/02 |
| 9,742,189 B2 | 8/2017 | Watanabe et al. | |
| 9,960,637 B2 * | 5/2018 | Sanders | H02J 3/381 |
| 10,211,638 B2 * | 2/2019 | Do Rosario | G06Q 50/06 |
| 10,516,270 B2 * | 12/2019 | Zimmanck | H02J 3/241 |
| 10,605,229 B2 * | 3/2020 | Zhang | F03D 9/257 |
| 10,642,241 B2 * | 5/2020 | Chen | H02J 13/00017 |
| 10,852,706 B2 * | 12/2020 | Lian | G05B 19/0426 |
| 10,935,945 B2 * | 3/2021 | Morton | H02J 3/48 |
| 10,996,704 B2 * | 5/2021 | Zimmanck | H02J 3/381 |
| 11,108,237 B2 * | 8/2021 | Clifton | H02J 13/00034 |
| 11,126,213 B2 * | 9/2021 | Forbes, Jr. | H02J 3/14 |
| 2006/0229768 A1 | 10/2006 | Chassin et al. | |
| 2010/0198423 A1 * | 8/2010 | Hirst | G01D 4/004 |
| | | | 700/292 |
| 2012/0313593 A1 | 12/2012 | Knuppel et al. | |
| 2012/0316688 A1 * | 12/2012 | Boardman | H02J 13/00026 |
| | | | 700/291 |
| 2016/0161966 A1 * | 6/2016 | Gil | G05F 1/66 |
| | | | 700/291 |
| 2016/0313716 A1 | 10/2016 | Chen et al. | |
| 2016/0363949 A1 | 12/2016 | Zimmanck et al. | |
| 2017/0194792 A1 | 7/2017 | Zimmanck et al. | |
| 2019/0252882 A1 * | 8/2019 | Li | H02J 3/14 |
| 2020/0127459 A1 * | 4/2020 | Zimmanck | H02J 3/24 |
| 2020/0307402 A1 * | 10/2020 | Poilasne | B60L 53/62 |
| 2020/0412167 A1 * | 12/2020 | Duan | H02J 13/00002 |
| 2021/0234398 A1 * | 7/2021 | Morton | H02J 3/32 |

FOREIGN PATENT DOCUMENTS

| | | |
|---|---|---|
| CN | 103001223 B | 7/2014 |
| DE | 102014106354 A1 | 11/2015 |
| GB | 2467159 A | 7/2010 |
| JP | 2016/213933 A | 12/2016 |
| KR | 10-2012-0031753 A | 4/2012 |
| KR | 10-1259728 B1 | 5/2013 |
| WO | WO-2013/101521 A1 | 7/2013 |
| WO | WO-2017/019136 A1 | 2/2017 |

* cited by examiner

METHOD AND APPARATUS FOR AUTOMATIC INTERLEAVING OF CYCLED LOADS IN A MICROGRID

CROSS-REFERENCE TO RELATED APPLICATION

This application claims benefit of U.S. provisional patent application Ser. No. 62/879,919, titled "Automatic Interleaving of Cycled Loads in a Microgrid" and filed Jul. 29, 2019, which is herein incorporated in its entirety by reference.

BACKGROUND OF THE INVENTION

Field of the Invention

Embodiments of the present disclosure relate generally to smart loads in a microgrid and, more particularly, to autonomous, automatic interleaving of cycled smart loads in a microgrid.

Description of the Related Art

A conventional microgrid generally comprises at least one energy generator, at least one energy storage device, and at least one energy load. In small microgrids, a lack of load diversity can create a large peak-power-to-average-power ratio as a small collection of large but intermittent loads cycle on and off. Many of these loads are quite flexible as to when they can cycle on and off with little to no effect on the user. For example, a refrigerator can delay its turn on cycle by five minutes with a negligible drop in temperature. Loads that fit this category include refrigerators/freezers, well pumps (with pressure tanks), water heaters (not tankless), air conditioners, and furnaces.

For small microgrid systems (e.g., less than ten homes), a considerable reduction in the peak power requirement can be achieved by coordinating the activation and deactivation of these types of loads so that they are interleaved. This in turn allows for a lower cost system as it can be designed for a lower peak power level. Although such coordination could be achieved in a relatively straightforward manner using communications, the additional required networking equipment and controllers would add cost, complexity, and hinder robustness of the system.

Therefore, there is a need in the art for a technique to coordinate the load cycling using an autonomous distributed control architecture.

SUMMARY OF THE INVENTION

Embodiments of the present invention generally relate to automatic interleaving of cycled loads in a microgrid as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
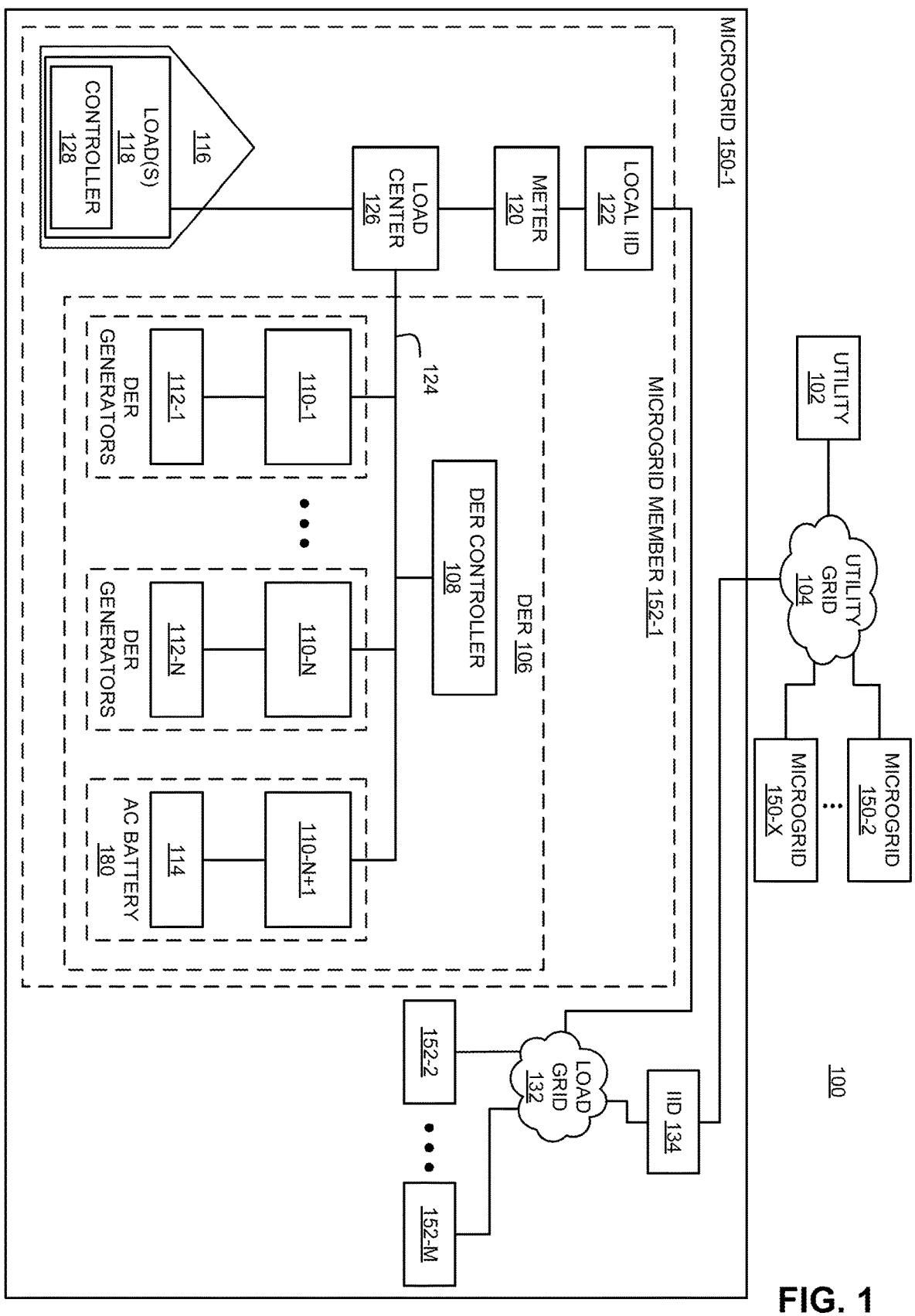
FIG. 1 is a block diagram of a power system in accordance with one or more embodiments of the present invention.

Embodiments of the present invention generally relate to a method and apparatus for autonomous, automatic interleaving of cycled loads in a microgrid. In one or more embodiments, a distributed, autonomous, communication-less technique is utilized by a plurality of cycled smart loads in a microgrid to decrease the likelihood of more than one of the cycles loads will activate at the same time and thereby increase the level of stress on the grid above a desired threshold.

The loads employing the techniques described herein, which may be referred to as "smart loads", typically run at low duty cycles (e.g., refrigerators, well pumps, furnaces in well-insulated homes, and the like) and often pull very high power (e.g., electric dryers, washing machines, and the like). The techniques described herein allow a smart load to autonomously and opportunistically activate (i.e., turn on) and deactivate (i.e., turn off) using locally-measured information regarding the grid state (i.e., a locally-measured grid-stress indicator), while decreasing the likelihood of multiple loads on the same grid activating at the same time, and further, in various embodiments, without any external communication. In certain embodiments, a smart load may additionally measure one or more local smart load parameters that indicate a present state of the smart load, for example an air conditioner may measure the room temperature and utilize the measured information in determining when to raise the relative likelihood of it activating and/or deactivating when the grid stress is low enough to allow it.

In one or more embodiments, large but intermittent smart loads employ hysteretic droop curves and are programmed to be allowed to turn on below a first threshold of grid stress (which also may be called a turn-on or activation threshold) and forced to turn off above a second threshold of grid stress (which also may be called a turn-off or deactivation threshold). When a smart load is allowed to turn on, it delays its activation for some time period, such as a random time in a delay window (e.g., 5 seconds). If the grid stress rises above its allowed turn-on threshold during the time window (e.g., if another load took the opportunity to turn on during that time period), then the smart load must wait for the next opportunity when the grid stress reaches the turn-on threshold. Generally, the delay is a function of the number of missed opportunities to turn on during the time period in which a smart load desiring activation is waiting to turn on; for example, the delay may be decreased each time an opportunity for a smart load to turn on is missed. The delay window can be dynamically tailored to increase or decrease the likelihood of a smart load turning on during the allowable window. For example, as a refrigerator misses one or more turn-on opportunities and its internal temperature rises, it can start to shorten its turn-on window (and/or lower the grid stress turn-on threshold) to increase the likelihood that it will turn on.

Generally, the smart loads employ a simplified droop control technique, although in some embodiments the system uses a generalized droop control in which case "frequency" actually represents a "modified frequency", which is a function of frequency and voltage. A smart load may determine the state of the grid (i.e., the grid stress) using locally-measured grid voltage and/or locally-measured grid frequency. In one or more alternative embodiments, the power system may include a secondary/tertiary control system which re-centers the voltage and frequency using system wide communications. In such embodiments, these biases are included in the grid stress calculation.

The technique described herein provides a distributed and hierarchical means of coordinating smart loads on a grid and allows for a reduction in the peak power demands of small systems which in turn facilitates a lower overall system cost (e.g., fewer power converters are needed). By incorporating a delay period as described herein, smart loads can be differentiated from each other and preference can be given to smart loads that have been waiting to turn on but missed a number of opportunities over those loads that have already had the opportunity to turn on or having not been waiting as long to turn on. Additionally or alternatively, preference to turn on can be given to a load based on its criticality.

FIG. 1 is a block diagram of a power system 100 in accordance with one or more embodiments of the present invention. This diagram only portrays one variation of the myriad of possible system configurations. The present invention can function in a variety of environments and systems.

The power system 100 comprises a utility 102 (such as a conventional commercial utility) and a plurality of microgrids 150-1, 150-2, . . . , 150-X (collectively referred to as microgrids 150) coupled to the utility 102 via a utility grid 104. Through their connections to the utility grid 104, each microgrid 150 as a whole may receive energy from the utility grid 104 or may place energy onto the utility grid 104. Each microgrid 150 is capable of operating without energy supplied from the utility 102 and may cover a neighborhood, a village, a small city, or the like, as the term "microgrid" is not intended to imply a particular system size. Although only the microgrid 150-1 is depicted in detail in FIG. 1 and described herein, the microgrids 150-2 through 150-X are analogous to the microgrid 150-1, however the number and/or type of various microgrid components may vary among the microgrids 150.

The microgrid 150-1 comprises a plurality of microgrid members 152-1, 152-2, . . . , 152-M (collectively referred to as microgrid members 152) each coupled to a local grid 132 which in turn is coupled to the utility grid 104 via an island interconnect device (IID) 134 for disconnecting from/connecting to the utility grid 134. The local grid 132 may be a trunk of the utility grid 104 or it may be a specifically designed local grid for the microgrid 150-1. Although only the microgrid member 152-1 is depicted in detail in FIG. 1 and described herein, the microgrid members 152-2 through 152-M are analogous to the microgrid member 152-1, although the number and/or types of various microgrid member components may vary among the microgrid members 152.

The microgrid member 152-1 comprises a building 116 (e.g., a residence, commercial building, or the like) coupled to a load center 126 which may be within or outside of the building 116. The load center 126 is coupled to the local grid 132 via a utility meter 120 (which measures the ingress and egress of energy for the microgrid member 152-1) and a local IID 122 for disconnecting from/connecting to the local grid 132, and is further coupled to a distributed energy resource (DER) 106 and one or more smart loads 118.

The DER 106 comprises power conditioners 110-1 . . . 110-N, 110-N+1 coupled in parallel to a bus 124 that is further coupled to the load center 126. Generally the power conditioners 110 are bi-directional power conditioners and those power conditioners 110 in a first subset of power conditioners 110 are coupled to DC energy sources 112 (for example, renewable energy sources such as wind, solar, hydro, and the like) while the power conditioners 110 in a second subset of power conditioners 110 are coupled to energy storage devices 114 (e.g., batteries, flywheels, compressed air storage, hot water heaters, electric cars, or the like). The combination of a DC energy source 112 and a corresponding power conditioner 110 may be referred to herein as a DER generator. In embodiments where the power conditioners 110 are DC-AC inverters, a power conditioner 110 and a corresponding energy storage device 114 may together be referred to herein as an AC battery 180. Each of the power conditioners 110 comprises a controller for operating the corresponding power conditioner 110.

The DER 106 comprises a DER controller 108 that is coupled to the bus 124 and communicates with the power conditioners 110 (e.g., via power line communications (PLC) and/or other types of wired and/or wireless techniques) for sending command and control signals, receiving data (e.g., status information, data related to power conversion, and the like), and the like. In some embodiments, the DER controller 108 is further coupled, by wireless and/or wired techniques, to a master controller or gateway (not shown) via a communication network (e.g., the Internet) for communicating data to/receiving data from the master controller (e.g., system performance information and the like).

Each of the power conditioners 110 is a droop-controlled power conditioner such that when the microgrid member 152-1 is disconnected from the local grid 132 and/or the utility grid 104, the power conditioners 110 employ a droop control technique for parallel operation without the need for any common control circuitry or communication between the power conditioners 110. Each of the power conditioners 110 comprises a power conditioner controller having at least one processor, support circuits, and a memory comprising an operating system (as needed) and a droop control module for implementing the droop control techniques, thereby allowing the power conditioners 110 to share the load in a safe and stable manner.

Each of the smart loads 118 is a cycled load that typically runs at low duty cycles (e.g., refrigerators, well pumps, furnaces in well-insulated homes, and the like) and often pull very high power (e.g., electric dryers, washing machined, and the like), obtained via the load center 126.

Although depicted within the building 116, one or more of the smart loads 118 may be located outside of the building 116.

Each of the smart loads 118 comprises one or more components for measuring grid parameters, such as grid frequency and/or grid voltage, and a component controller 128, described in detail further below with respect to FIG. 2, for implementing the techniques described herein; in some embodiments, the component controller 128 may measure the grid frequency and/or voltage.

In accordance with one or more embodiments of the present invention, each of the smart loads 118 autonomously determines a measure of local grid stress and autonomously determines when to activate (turn on) and/or deactivate (turn off) as described in detail below such that the likelihood of multiple loads on the local grid 132 activating at the same time is reduced or eliminated in order to prevent the level of grid stress from exceeding a desired threshold.

Figure 2:
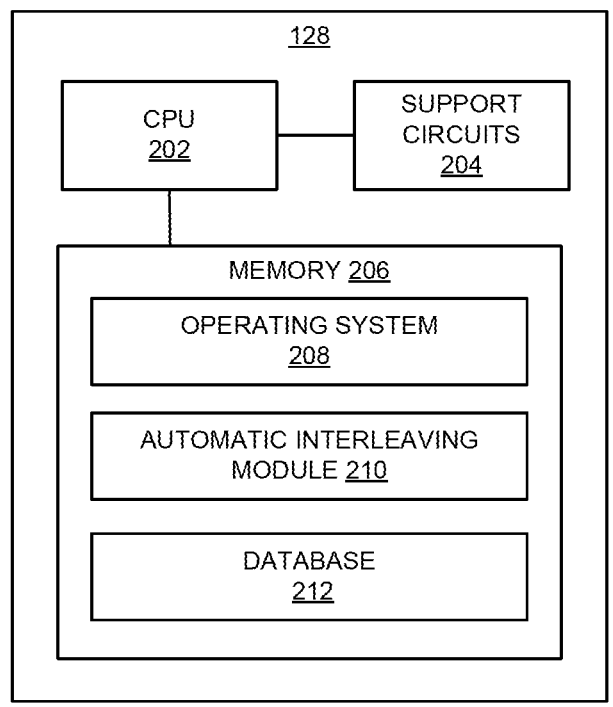
FIG. 2 is a block diagram of a smart load controller in accordance with one or more embodiments of the present invention.

FIG. 2 is a block diagram of a smart load controller 128 in accordance with one or more embodiments of the present invention. The smart load controller 128 (which may simply be referred to as "controller 128") comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The component controller 128 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The support circuits 204 are well known circuits used to promote functionality of the CPU 202. Such circuits include, but are not limited to, a cache, power supplies, clock circuits, buses, input/output (I/O) circuits, and the like.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 128 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as an automatic interleaving module 210 for, when executed, implementing the techniques described herein to autonomously determine activation and/or deactivation of the corresponding smart load.

The memory 206 additionally stores a database 212, for example for storing data related to the operation of the corresponding smart load and/or the invention described herein, such as one or more thresholds (e.g., thresholds for grid stress, activation, and deactivation), and the like.

Figure 3:
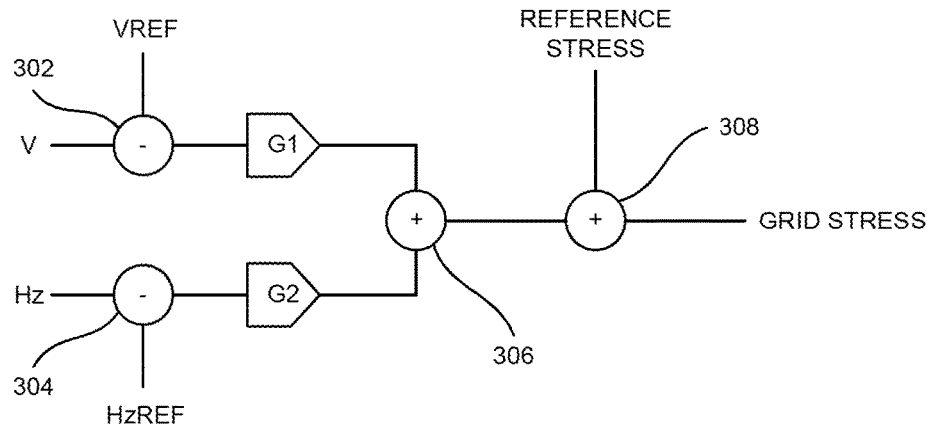
FIG. 3 is a depiction of grid stress calculation logic in accordance with one or more embodiments of the present invention.

FIG. 3 is a depiction of grid stress calculation logic in accordance with one or more embodiments of the present invention. The logic depicted in FIG. 3 may be implemented by the smart load controller 128.

Each smart load 118 employs a droop control based technique to perform a grid stress calculation to determine whether the grid can manage its activation at that particular time without exceeding a particular grid stress level (i.e., a grid stress level threshold, which may also be referred to as a grid stress threshold or simply a stress threshold). Both grid voltage and grid frequency are utilized in indicating the grid stress at a given time, although in some other embodiments one or the other alone is used in determining the grid stress.

As depicted in FIG. 3, measured grid voltage and measured grid frequency are each compared (at 302 and 304, respectively) to a corresponding reference signal, which provides an indication of the amount the grid voltage and frequency drooping, and the resulting outputs are each multiplied by a corresponding coefficient (G1 and G2, respectively) analogous to a droop gain. The resulting outputs are added together at adder 306 to generate an indication of an amount of active current that would be injected onto the grid by a generator employing droop control; the greater the amount of active current that would be injected, the greater the stress of the grid. The computed amount of active current is then compared with a reference stress value to obtain a measure of grid stress (which may also be referred to as a grid stress value or computed grid stress) in units of percent grid capacity. For example, a grid stress value of 100% indicates that the system is operating at maximum capacity. In other embodiments, the grid stress indicator may be a function of the active, reactive, or apparent current/power (where $apparent^2=active^2+reactive^2$).

In one or more embodiments where the AC power system utilizes a primary regulation technique where generation assets are programmed to respond to V/F, the value of G1 may be set to the Watts-to-Volts aggregate response in % N, and G2 may be set to the Watts-to-Hz aggregate response in %/Hz. For example, in certain embodiments where the system only has frequency governing action on generation assets (i.e., the system is only running frequency droop) and having one 100 kW generator with 20 kW/Hz droop action and one 50 kW generator with 15 kW/Hz droop action, G1=0 since only frequency droop is being run (i.e., voltage is not being addressed), and G2 is the aggregate of the two system generators where the sum of the droop action of the generators is divided by the sum of the total capacity to obtain the total percentage of frequency action:

$$G2=(20\ kW/Hz+15\ kW/Hz)/(100\ kW+50\ kW)=23\%/Hz$$

The grid stress threshold is set such that activation of a load (i.e., turning on the load) does not push the system over its rated capacity. For example, for a capacity of 150 kW and a 10 kW load, the maximum stress threshold would equal (150−10)/150=93.3%—i.e., if the system would need to be operating at a minimum of 140 kW in order for the load to turn on without driving the system above its rated capacity. In one or more embodiments, a margin may be added to the grid stress threshold, for example on the order of 5-10%; in certain embodiments, the grid stress threshold margin may be dynamically determined.

By utilizing the techniques described herein, smart loads not having an immediate urgency to turn on and having some flexibility as to when they can turn on (e.g., well pumps, motors, and the like) have an automated means by which they can strategically turn on when the system has sufficient power to support them. Each load can independently and autonomously evaluate the stress on the grid at a particular time and determine whether the grid has sufficient power for the load to operate at that time.

For example, a neighborhood of five homes all running off-grid and all interconnected together may all be running a well, where a switch turns on a home's well pump when the well's pressure tank drops below a certain pressure and turns off the pump when the pressure reaches a particular threshold, e.g., the well pump may turn on at 40 PSI and turn off at 70 PSI. In order to prevent all of the well pumps from activating at the same time and thereby increasing the grid stress above a desired level, each well pump employs the techniques described herein to automatically ensure they're not turning on at the same time and are automatically interleaved so that the system isn't required to support them all being on at the same time.

Figure 4:
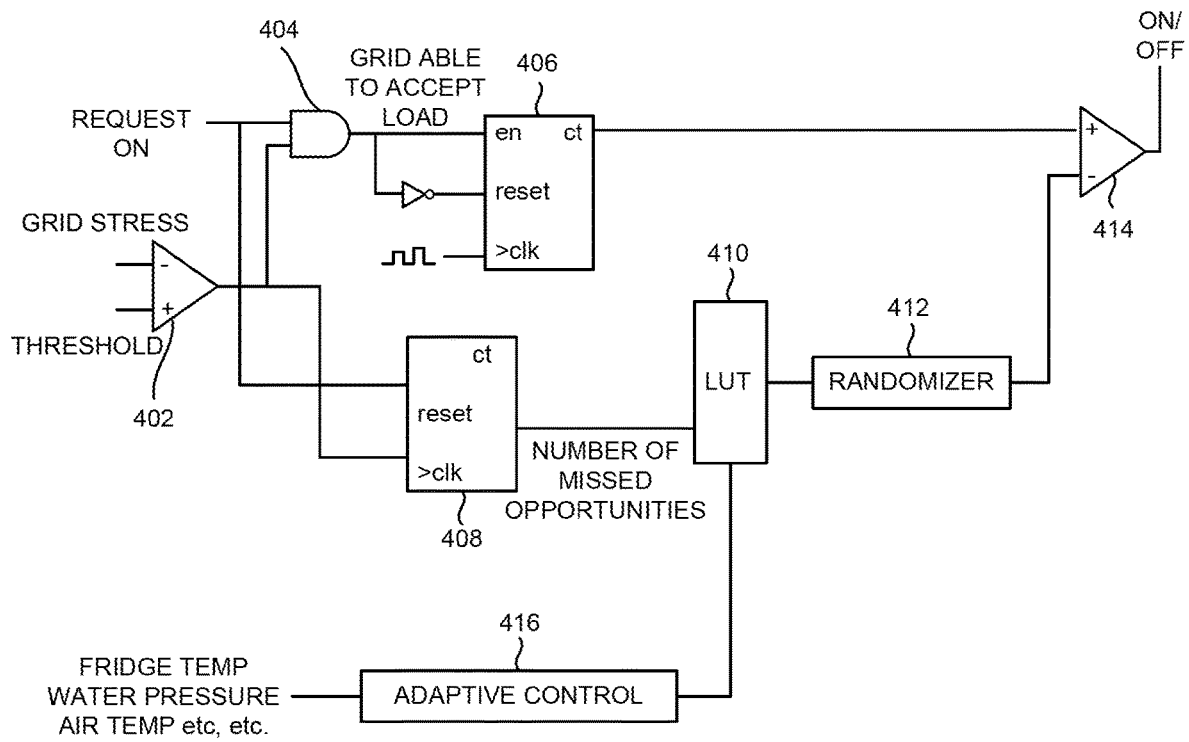
FIG. 4 is a depiction of the logic employed by a smart load in determining whether to activate.

FIG. 4 is a depiction of the logic employed by a smart load in determining whether to activate in accordance with one or more embodiments of the present invention. The logic depicted in FIG. 4 may be implemented by the smart load controller 128.

As shown in FIG. 4, the computed grid stress and the grid stress threshold (which may be referred to as an activation threshold) are inputs to a comparator circuit 402, with the comparator circuit output indicating when the grid has sufficient power to support the load (i.e., when the computed grid stress is less than the grid stress threshold). The comparator output is fed to an AND gate 404 along with a request to turn on when the load would like to activate. Continuing the well pump example described above, the load request to turn on would occur when the tank pressure falls below a lower pressure threshold, e.g., 40 PSI. Rather than the load turning on whenever the well pump pressure falls below the lower pressure threshold, the load first determines whether the grid has sufficient power to support the load. A logical high output of the AND gate 404 indicates that the grid has sufficient power to accept the load turning on at the time that the load wants to turn on.

The output of the AND gate 404 is fed into the enable input of a latch 406, i.e., a first counter, which acts as a delay and begins counting up when the enable input is high (i.e., when the load wishes to turn on and the grid has sufficient power to accept the load); when the enable input is zero—i.e., when one or both of the grid stress being above the grid stress threshold or the load not wanting to activate occurs—the count is reset (e.g., to zero). By initiating a delay (which may be referred to as a turn-on delay) when a load wants to activate and the grid can accept it, the resulting randomization reduces or eliminates the likelihood of loads turning on at the same time and driving the grid stress above a desired threshold. The output of the first counter 406 is fed into the non-inverting input of a second comparator 414.

A second counter 408 receives the output from the grid stress threshold comparator 402 (i.e., the indication of whether the grid can support the load at the time it wishes to turn on) to its clock input and the load turn-on request to its reset input; the second counter 408 is reset when the load no longer wants to turn on. When the grid is able to support the load at the time it wishes to turn on but during the turn-on delay the amount of power on the grid has changed (e.g., due to one or more other loads activating) such that the grid can no longer support the load, the second counter 408 increments to indicate the number of these missed turn-on opportunities that occur. The resulting number of missed turn-on opportunities is fed into a lookup table 410, the output of which is fed to a randomizer 412.

The lookup table 410 enables the turn-on delay to be adjusted based on the number of missed turn-on opportunities. For example, the first time the load wants to turn on it can be assigned a relatively long delay, and subsequent delays are made successively shorter each time a turn-on opportunity is missed by the load. By continually reducing the length of subsequent delays, the likelihood that the load will be able to turn on increases the longer the load waits. The randomizer 412 decreases the likelihood that multiple loads will turn on at the same time; for example, it decreases the likelihood that multiple loads within the same system and using identical lookup tables (e.g., all made by the same manufacturer) will select the same value in the lookup tables and turn on at the same time. The output of the randomizer 412 is fed to the inverting input of the second comparator 414.

In certain embodiments, depending on the type of smart load, adaptive control based on a current state of the smart load (e.g., refrigerator temperature, tank water pressure, air temperature, and the like) may be used to provide an adaptive, state-dependent turn-on delay; e.g., as depicted in FIG. 4, the output of such adaptive control 416 may be fed into the lookup table. Continuing the example of the water pump, when the pressure drops to a first low threshold, e.g., 40 PSI, the water pressure may still be satisfactory to users and so the turn-on delay can be relatively high. If the water pressure falls below a second low threshold while waiting to turn on, e.g., 30 psi, the need to turn on becomes more urgent as the danger increases of the water pressure dropping so low that it's not usable. At such time, the turn-on delay can be suitably adjusted to a lower amount. For example, for a smart load that is a refrigerator compressor, the load may measure the internal temperature of the refrigerator and raise the urgency for turning on if the temperature rises to a point where the food might spoil. Other examples of smart load that can make a determination of its current state and according adjust a turn-on delay include HVAC devices (thermostats, air conditioners, heaters, and the like), water pressure devices, and the like.

Figure 5:
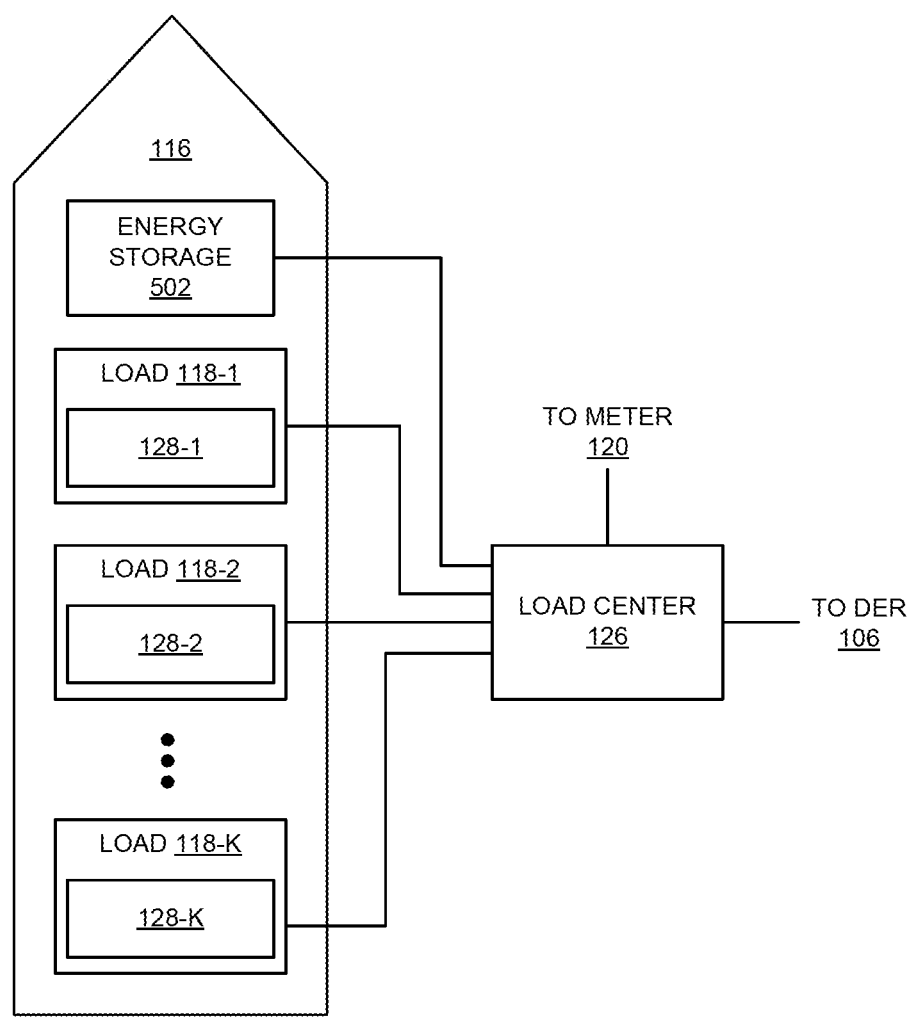
FIG. 5 is a block diagram depicting a plurality of behind-the-meter connections in accordance with one or more embodiments of the present invention.

FIG. 5 is a block diagram depicting a plurality of behind-the-meter connections in accordance with one or more embodiments of the present invention. As shown in FIG. 5, a plurality of smart loads 118-1, 118-2 . . . 118-K, each having a corresponding controller 128-1, 128-2 . . . 128-K, and an energy storage unit 502 are behind the meter 120 and are coupled to the load center 126. Although depicted within the building 116, one of more of the loads 118-1, 118-2 . . . 118-K and the energy storage unit 502 may be located outside of the building 116.

As previously described, the smart loads 118-1, 118-2 . . . 118-K typically run at low duty cycles and often pull very high power, e.g., refrigerators, well pumps, furnaces, air conditioners, electric dryers, washing machines, and the like. The energy storage unit 502 may be any suitable device that can store and deliver energy; in some embodiments, the energy storage unit 502 may also have a controller, analogous to the controller 128, for controlling the unit's energy storage and/or delivery. Although a single energy storage unit 502 is shown, other embodiments may have additional energy storage units 502 or no energy storage unit 502.

In certain embodiments, one or more of the loads 118-1, 118-2 . . . 118-K and the energy storage unit 502 may be connected to analogous smart loads and/or energy storage units in another microgrid member 152 via an electrical connection that is not part of the utility grid 104/local grid 132 such that the flow of power between loads and/or energy storage units bypasses the utility grid. For example, the load center 126 and an analogous load center in another microgrid member 152 may be coupled to one another via an electrical cable, separate from the utility grid, such that energy may bypass the utility grid and flow between components of the different microgrid members 152 (e.g., DERs 106, loads 118, energy storage devices 502). In some of such embodiments, one or more of the DERs 106, loads 118, and energy storage devices 502 may control the energy flow over the electrical cable, while in other such embodiments a separate device may be utilized to control the energy flow over the electrical cable. For example, each participating microgrid member 152 may comprise an energy flow control device for controlling such energy flow. In some of these embodiments, the energy flow control devices may be coupled to the load centers (or may be part of the load centers) of their corresponding microgrids for controlling the energy flow; in others of these embodiments, the energy flow control devices may be coupled to components of their corresponding microgrid members and to one another without the use of a load center.

Figure 6:
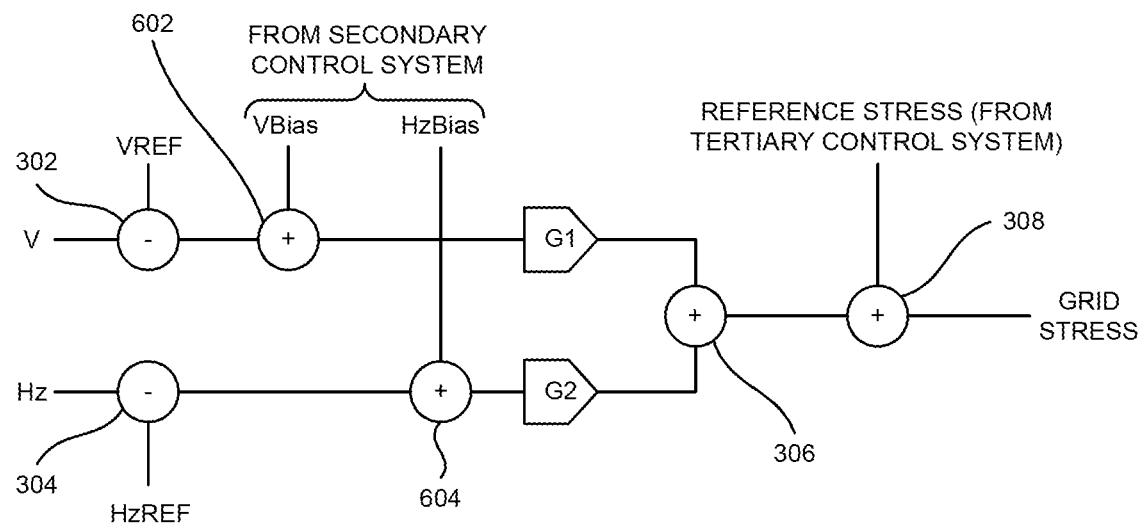
FIG. 6 is a depiction of grid stress calculation logic with respect to a power system that includes a secondary and tertiary control system in accordance with one or more embodiments of the present invention.

FIG. 6 is a depiction of grid stress calculation logic with respect to a power system that includes a secondary and tertiary control system in accordance with one or more embodiments of the present invention. The logic depicted in FIG. 6 may be implemented by the smart load controller 128.

The grid stress calculation logic shown in FIG. 6 differs from that shown in FIG. 3 in that the power system corresponding to FIG. 6 includes a secondary/tertiary control system which re-centers the voltage and frequency using system wide communications, and, as depicted in FIG. 6, these biases are included in the grid stress calculation. As shown in FIG. 6, at adder 602 the voltage bias from the secondary control system is added to the output from 302; the result is multiplied by the coefficient G1 and coupled to the adder 306. At adder 604 the frequency bias from the secondary control system is added to the output from 304; the result is multiplied by the coefficient G2 and coupled to the adder 306. At adder 308, the output from the adder 306 is added to a reference stress from the tertiary control system. The output from the adder 308 is the computed grid stress.

Figure 7:
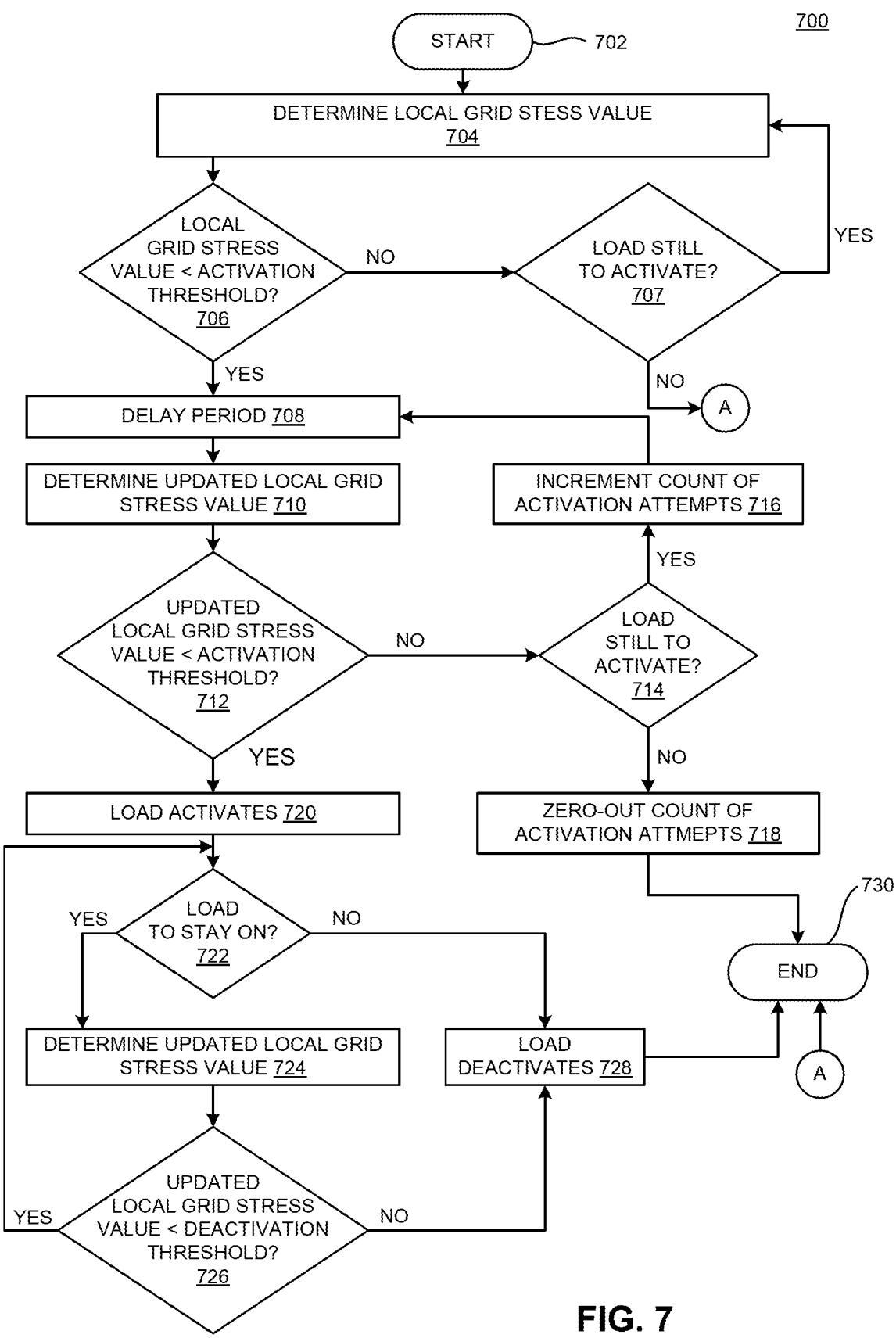
FIG. 7 is a flow diagram of a method for autonomously and automatically interleaving cycled loads coupled to a grid in accordance with one or more embodiments of the present invention.

FIG. 7 is a flow diagram of a method 700 for autonomously and automatically interleaving cycled loads coupled to a grid in accordance with one or more embodiments of the present invention. The method 700 is an implementation of the automatic interleaving module 210; in some embodiments, a non-transitory computer readable medium comprises a program that, when executed by a smart load controller, performs the method 700 that is described below. In various embodiments, smart loads coupled to a grid employ the technique described below to decrease the likelihood that more than one of the loads will activate at the same time and thereby increase the level of stress on the grid above a desired threshold.

The method 700 starts at step 702 and proceeds to step 704. At step 704, a local grid stress value for a load having a request to activate is determined as previously described. The method proceeds to step 706, where a determination is made whether the local grid stress value is less than an activation threshold. The activation threshold is a grid stress threshold, determined as described above. If the result of the determination is no, that the local grid stress level is not less than the activation threshold (i.e., the grid does not have sufficient power to support the load at that time), the method 700 proceeds to step 707, where a determination is made whether the load still has a request to activate. If the result of the determination at step 707 is yes, that the load should still activate, the method 700 returns to step 704; if the results of the determination at step 707 is no, that the load should not still turn on, the method proceeds to step 730 where it ends.

If, at step 706, the result of the determination is yes, that the local grid stress value is less than the activation threshold, the method 700 proceeds to step 708. At step 708, a delay period is activated where the load waits a delay time as described above. The method 700 then proceeds to step 710, where an updated local grid stress value is determined; in some embodiments, local grid stress value is periodically (e.g., continuously or near-continuously) updated based on current local grid conditions.

At step 712, the updated local grid stress value is compared to the activation threshold; in some embodiments, the value of the activation threshold may be periodically updated, for example when changes to the grid occur. If, at step 712, the result of the determination is no, that the local grid stress level is no longer less than the activation threshold, the method 700 proceeds to step 714.

At step 714, a determination is made whether the load still has a request to activate. If, at step 714, the result of the determination is yes, that the load should still activate, the method 700 proceeds to step 716 where a count of the number of activation attempts is incremented. The method 700 returns to step 708, where a delay period, which may be modified as described above, is entered.

If, at step 714, the result of the determination is no, that the load no longer has a request to activate and should not turn on, the method 700 proceeds to step 718 where the count of the number of activation attempts is zeroed out, and the method 700 proceeds to step 730 where it ends.

If, at step 712, the result of the determination is yes, that the updated local grid stress value is less than the activation threshold, the method 700 proceeds to step 720 where the load activates. At step 722, a determination is made whether it is desired that load remain active. If, at step 722, the result of the determination is no, that the load should not remain active, the method 700 proceeds to step 728 where the load deactivates, and then to step 730 where the method 700 ends.

If, at step 722, the result of the determination is yes, that the load should remain active, the method 700 proceeds to step 724 where an updated local grid stress value is determined. The method 700 proceeds to step 726, where a determination is made whether the updated local grid stress value is less than a deactivation threshold. The deactivation threshold indicates a level of grid stress such that the load can no longer be supported by the grid, and may be determined utilizing the same techniques used to determine the activation threshold. In some embodiments, the activation threshold and the deactivation threshold may be the same.

If, at step 722, the result of the determination is yes, that the updated local grid stress value is less than the deactivation threshold, the method 700 returns to step 722. If, at step 722, the result of the determination is no, that the updated local grid stress value is not less than the deactivation threshold, the method 700 proceeds to step 728 where the load deactivates, and then to step 730 where the method 700 ends.

While the foregoing is directed to embodiments of the present invention, other and further embodiments of the invention may be devised without departing from the basic scope thereof, and the scope thereof is defined by the claims that follow.

The invention claimed is:

1. A method for autonomous, automatic interleaving of cycled loads coupled to a grid, comprising:

determining, by a smart load coupled to a grid, a first grid stress value;

comparing, by the smart load, the first grid stress value to an activation threshold;

waiting, by the smart load, when the first grid stress value is less than the activation threshold, a delay period;

determining, by the smart load and after the delay period ends, a second grid stress value;

comparing, by the smart load, the second grid stress value to the activation threshold; and activating, by the smart load, when the second grid stress value is less than the activation threshold.

2. The method of claim 1, wherein the delay period is a random amount of time within a delay window.

3. The method of claim 1, wherein the delay period is a function of number of missed opportunities for the smart load to turn on during a time period in which the smart load is waiting to turn on.

4. The method of claim 1, wherein the delay period is dynamically adjusted based on a state of the smart load.

5. The method of claim 1, wherein the activation threshold is determined such that activation of the smart load does not cause a system in which the smart load operates to operate over its rated capacity.

6. The method of claim 1, wherein the activation threshold is dynamically determined.

7. The method of claim 1, wherein the first and the second grid stress values are computed utilizing a frequency bias from a secondary control system, a voltage bias from the secondary control system, and a reference stress bias from a tertiary control system.

8. An apparatus for autonomous, automatic interleaving of cycled loads coupled to a grid, comprising:

a controller for a smart load coupled to a grid, the controller comprising one or more processors and a memory, the memory containing instructions executable by the one or more processors to determine a first grid stress value;

compare the first grid stress value to an activation threshold;

wait, when the first grid stress value is less than the activation threshold, a delay period;

determine, after the delay period ends, a second grid stress value;

compare the second grid stress value to the activation threshold; and activate the smart load when the second grid stress value is less than the activation threshold.

9. The apparatus of claim 8, wherein the delay period is a random amount of time within a delay window.

10. The apparatus of claim 8, wherein the delay period is a function of number of missed opportunities for the smart load to turn on during a time period in which the smart load is waiting to turn on.

11. The apparatus of claim 8, wherein the delay period is dynamically adjusted based on a state of the smart load.

12. The apparatus of claim 8, wherein the activation threshold is determined such that activation of the smart load does not cause a system in which the smart load operates to operate over its rated capacity.

13. The apparatus of claim 8, wherein the activation threshold is dynamically determined.

14. The apparatus of claim 8, wherein the first and the second grid stress values are computed utilizing a frequency bias from a secondary control system, a voltage bias from the secondary control system, and a reference stress bias from a tertiary control system.

15. A non-transitory computer readable medium comprising a program that, when executed by a processor, performs a method for autonomous, automatic interleaving of cycled loads coupled to a grid, comprising:

determining a first grid stress value associated with a smart load coupled to a grid;

comparing the first grid stress value to an activation threshold;

waiting, when the first grid stress value is less than the activation threshold, a delay period;

determining, after the delay period ends, a second grid stress value associated with the smart load;

comparing the second grid stress value to the activation threshold; and activating, when the second grid stress value is less than the activation threshold, the smart load.

16. The non-transitory computer readable medium of claim 15, wherein the delay period is a random amount of time within a delay window.

17. The non-transitory computer readable medium of claim 15, wherein the delay period is a function of number of missed opportunities for the smart load to turn on during a time period in which the smart load is waiting to turn on.

18. The non-transitory computer readable medium of claim 15, wherein the delay period is dynamically adjusted based on a state of the smart load.

19. The non-transitory computer readable medium of claim 15, wherein the activation threshold is determined such that activation of the smart load does not cause a system in which the smart load operates to operate over its rated capacity.

20. The non-transitory computer readable medium of claim 15, wherein the first and the second grid stress values are computed utilizing a frequency bias from a secondary control system, a voltage bias from the secondary control system, and a reference stress bias from a tertiary control system.

* * * * *